United States Patent [19]
White

[11] Patent Number: 5,457,480
[45] Date of Patent: Oct. 10, 1995

[54] INTEGRATED MOUSE AND NUMERICAL KEYPAD DEVICE

[75] Inventor: Nikolas White, Austin, Tex.

[73] Assignee: Dell USA, Austin, Tex.

[21] Appl. No.: 326,189

[22] Filed: Oct. 3, 1994

[51] Int. Cl.$^6$ ........................................................ G09G 3/02
[52] U.S. Cl. ............................................ 345/163; 345/168
[58] Field of Search .................................... 345/163, 168, 345/169, 172

[56] References Cited

U.S. PATENT DOCUMENTS

| | | | |
|---|---|---|---|
| 4,899,137 | 2/1990 | Behrens et al. | 178/18 |
| 4,917,516 | 4/1990 | Retter | 345/163 |
| 5,063,376 | 11/1991 | Chang | 345/163 |
| 5,313,229 | 5/1994 | Gilligan et al. | 345/163 |

*Primary Examiner*—Richard Hjerpe
*Assistant Examiner*—Regina Liang
*Attorney, Agent, or Firm*—David McCombs; James Huffman

[57] ABSTRACT

A device in which functions of both a conventional mouse and a numerical data entry keypad are integrated into a single unit is disclosed. A conventional mouse ball is disposed on the bottom of the device. Pointer select buttons are disposed on a forward portion of the top of the device and numerical entry keys are disposed on a rearward portion of the top of the device. A microprocessor responsive to the ball, buttons, and keys, generates appropriate signals for input to a single I/O port in a computer. A hood is also provided which is hingedly attached to the device between the forward and rearward portions thereof such that it is rotatable between a first position in which the numerical data entry keys are rendered accessible, thereby enabling the device to function as a numerical keypad, and a second position, in which the numerical data entry keys are rendered inaccessible, thereby enabling the device to function as a conventional mouse.

22 Claims, 2 Drawing Sheets

1

INTEGRATED MOUSE AND NUMERICAL KEYPAD DEVICE

TECHNICAL FIELD

The present invention relates generally to computer input devices and, more particularly, to a computer input device for inputting both location data for graphical objects on a graphical display and numerical data via a single input port.

BACKGROUND OF THE INVENTION

Computers generally have the capability to receive input data representing numerical entries and the location of a cursor or other graphical objects on a graphical display. Graphical location data is conventionally entered into a computer using a mouse detached from a keyboard or, where space is limited as it is with portable "laptop" or "notebook" computers, by using four cursor arrow keys or a trackball built into the keyboard. Numerical data, on the other hand, is conventionally entered into a computer utilizing an array of ten keys arranged either in a single row across the top of a keyboard, or in four rows as a numerical keypad detached from, or at one end of, a keyboard. Such a numerical keypad is not often used with portable computers because of space limitations.

A mouse is generally preferred over cursor keys and even a trackball because a mouse facilitates simpler, faster, and more precise entry of graphical location data into a computer. A mouse is therefore commonly connected to a input/output (I/O) port of a portable computer to supplement cursor keys and, if one is provided, a trackball. However, portable computers generally have a limited number of I/O ports and when a mouse is connected to an I/O port, there is often not another port available for a device such as a numerical keypad. For this reason, and the additional important reason that users of portable computers are generally interested in conserving space, numerical keypads are not often used with portable computers. Nevertheless, a numerical keypad would simplify the entry of numerical data and also reduce the time required to make such entries.

For the foregoing reasons, there is a need to be able to input to a portable computer both graphical location data as well as numerical data via a single port of a portable computer without using a large amount of space.

SUMMARY OF THE INVENTION

The foregoing problems are solved and a technical advance is achieved by a device which enables a user to input to a computer, via a single I/O port, both graphical location data and numerical data without using more space than a separate mouse or numerical data entry keypad. In a departure from the art, an integrated mouse and numerical keypad device of the present invention is capable of performing the functions of both a mouse and a numerical data entry keypad.

In a preferred embodiment of the invention, the device comprises a housing and a mouse ball rollingly disposed on the bottom of the housing so that a portion of the ball is exposed. At least one conventional mouse pointer select button is disposed on the forward portion of the top of the housing for selecting objects on a display and a plurality of depressible keys are disposed on the rearward portion of the top of the housing for entering numerical data. A microprocessor is provided for generating an output signals indicative of which button or key is pressed and/or indicative of the direction of rotation of the ball relative to the housing about two substantially orthogonal axes.

In accordance with a feature of the present invention, a hood is hingedly attached to the top side of the housing via a hinge between the forward and rearward portions thereof. The hinge permits the hood to be rotated approximately 180° between a closed position, in which the hood covers the keys such that the device may be used as a conventional mouse, and an open position, in which the keys are accessible and the device may be used as a conventional numerical keypad. The hood is shaped such that, when in the closed position, the device is as ergonomic as a conventional mouse.

In an alternative embodiment, at least two of the keys may be toggled between operation as numerical keys, in which they are used to input numerical data to the computer, and operation as mouse pointer selection keys, in which they may be used to input graphical location data to the computer. In this manner, the device may be used as a mouse even when the hood is open and the at least one mouse pointer select button is inaccessible.

A technical advantage achieved with the invention is economy of space, which is particularly important with a portable computer. By integrating into a single device the ability to input to a computer both graphical location data and numerical data, no more space is required than for a single mouse or a numerical data entry keypad.

A further technical advantage achieved with the invention is that it requires only one I/O port of a computer. This is important on a portable computer where there may not be two ports available for connecting a mouse as well as a separate numerical entry keypad.

Another technical advantage is that it is more economical financially to combine the functions of a mouse and keypad into the device disclosed by the present invention than it is to purchase a mouse and keypad separately.

DETAILED DESCRIPTION OF A PREFERRED EMBODIMENT

Figure 1:
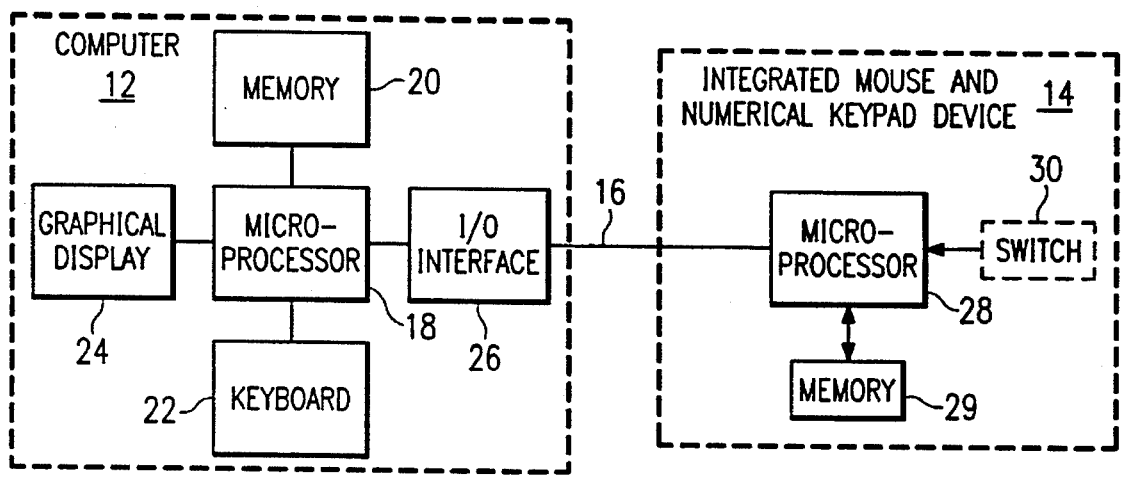
FIG. 1 is a block diagram of an integrated mouse and numerical keypad device embodying features of the present invention for inputting graphical location data and numerical data into a computer.

In FIG. 1, the reference numeral 10 designates a system of the present invention, which system includes a portable computer 12, to which is connected an integrated mouse and numerical keypad device 14 via a cable 16. The computer 12 includes a microprocessor 18 operatively connected to a memory 20, a keyboard 22, a graphical display 24, and an I/O interface 26. The device 14 includes a microprocessor 28, which is electrically connected to the microprocessor 18 via the cable 16 and I/O interface 26. The microprocessor 28 is also connected to a memory device 29 in which is stored logic instructions for execution by the microprocessor 28. As will subsequently be described in detail, in one embodiment, the device 14 may further include a switch 30 for providing a signal to the microprocessor 18 indicative of the position of a hood (FIGS. 2A and 2C) of the device 14.

Figure 2A:
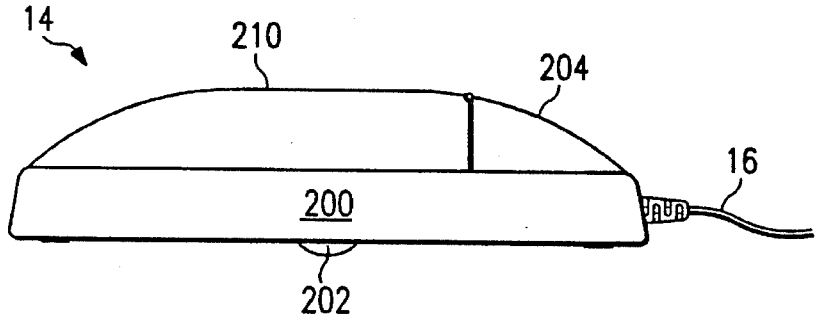
FIG. 2A is an elevational view of the fight side of the device shown in FIG. 1, activated for operation as a mouse.
Figure 2B:
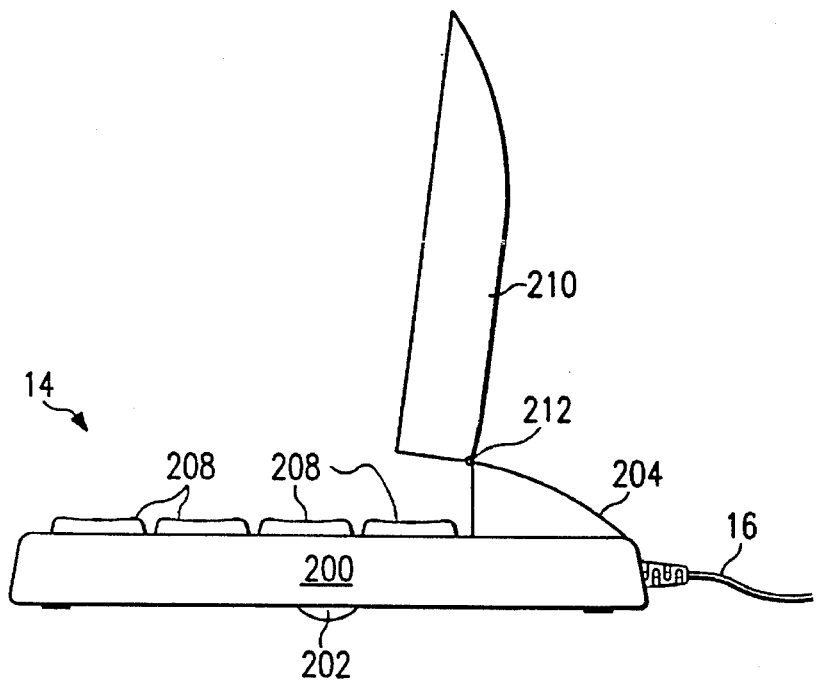
FIG. 2B is an elevational view of the right side of the device shown in FIG. 1, activated for operation as a numerical keypad.
Figure 2C:
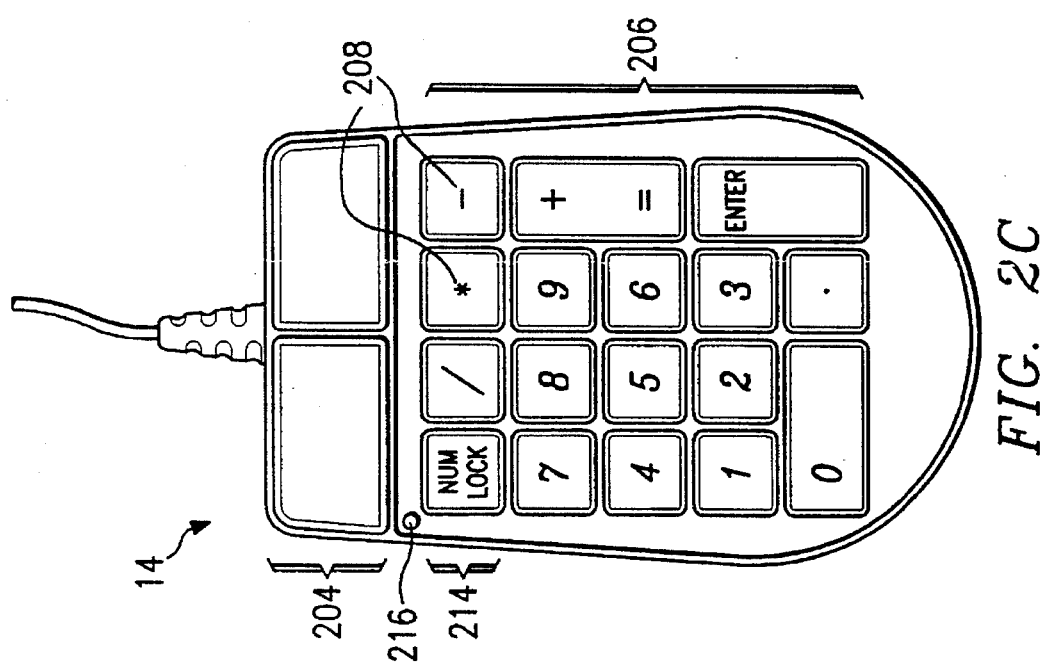
FIG. 2C is a top plan view of the device shown in FIG. 1, with the hood of the device removed.

FIGS. 2A–2C show elevational and top plan views of the device 14 (FIG. 1). As shown therein, the device 14 includes a housing 200 having a mouse ball 202 disposed on a bottom side thereof, two conventional mouse pointer select buttons 204 (FIG. 2C) disposed on a forward portion of a top side of the housing 200, a numerical keypad 206 disposed in a rearward portion of the top side of the housing 200 and including seventeen (17) keys, collectively designated by the reference numeral 208. The keys 208 include keys corresponding to the digits 0–9, a decimal point, four arithmetic functions +, −, *, /, and Enter and Num Lock functions and are arranged in a conventional numerical keypad format.

The device 14 further includes a hood 210 hingedly attached to the top side of the housing 200 via a hinge 212 located between the forward and rearward portions. Although not shown, it should be understood that rollers and transducers are disposed inside the device 14 for generating, in a conventional manner, electrical signals, i.e., "mouse data signals," indicative of the direction of rotation of the ball 202 about two orthogonal axes for indicating a relative location of the device 14. The microprocessor 28 is operatively connected in a conventional manner to receive and process signals generated responsive to depression of the buttons 204 and keys 208 and to receive and process the mouse data signals generated responsive to the rotation of the ball 202. The microprocessor 28 transmits the processed signals to the microprocessor 18 via the cable 16 and I/O interface 26. Because these individual components and their operation are well known in the art, they will not herein be described in further detail.

The hood 210 is rotatable about the hinge 212 approximately 180° between a closed position, as illustrated in FIG. 2A, and an open position, as illustrated in FIG. 2B. The open and closed positions of the hood 210 correspond to two modes in which the device 14 is operative, which are a "mouse mode" when the hood 210 is in the closed position, and a "keypad mode" when the hood 210 is in the open position. The hood 210 is shaped so that, in the closed position, it renders the device as ergonomic as a conventional mouse, while covering and rendering inaccessible the keypad 206, thereby preventing the keys 208 from being inadvertently pressed while the device 14 is in the mouse mode. When the hood 210 is in the open position, the keypad 206 is rendered accessible, and the buttons 204 are rendered, for practical purposes, inaccessible.

Referring to FIG. 2C, in one aspect of the invention, selected keys 214 on the top row of the keypad 206 may be toggled between operation as mouse pointer select buttons and as numerical data entry keys. Conventional control logic is provided in the memory 20 (FIG. 1) of the computer 12 so that depression of a predetermined combination of keys (such as Ctrl+Num Lock) on the keyboard 22 (FIG. 1) or on the keypad 206 toggles the operation of the keys 214 between mouse pointer select and numerical data entry. A light emitting diode (LED) 216 is provided in the upper left corner portion of the keypad 206. The LED 216 is operatively connected to the microprocessor 28 so that, when the keys 214 are toggled to be operable as mouse pointer select buttons, the LED 216 is turned on and the two leftmost keys function as the conventional left mouse button and the two rightmost keys function as the conventional right mouse button.

In operation, with reference to FIG. 1, the cable 16 is first plugged into an I/O port (not shown) on the I/O interface 26 to provide electrical signal communication between the device 14 and the computer 12. The device 14 may then be operated as either a mouse or as a keypad, as described below.

To operate the device 14 as a mouse, the hood 210 is closed over the keypad 206 (FIG. 2A). The device 14 may then be moved about on a flat surface to cause the mouse ball 202 to roll and a cursor or other graphical object to move in a corresponding direction on the graphical display 24. Either or both of the two pointer select buttons 204 may also be pressed to select a function defined by application software stored in the memory 20 and identified on the graphical display 24 in a typical manner. As discussed above, the microprocessor 28 processes and transmits to the computer signals responsive to the rotation of the ball 202 and actuation of the buttons 208 via the cable 16 and the interface 26. Responsive to the signals received from the microprocessor 28, the microprocessor 18 causes a cursor or other graphical object to move across the graphical display 24 or a function displayed on the display 24 to be selected and executed.

To operate the device 14 to enter numerical data, the hood 210 is opened so that the keypad 206 is accessible (FIG. 2B). The keys 208 may then be pressed to enter the desired data or function. Accordingly, the microprocessor 28 processes and transmits a signal, responsive to the keys 208 that are pressed, to the computer 12 via the cable 16 and the interface 26. As discussed above, if the keys 214 are toggled, then the two leftmost keys on the top row of keys may be used to simulate the left mouse button and the two rightmost keys may be used to simulate the right mouse button. Thus, by toggling the keys 214, the device 14 may be used as a mouse and a keypad concurrently.

The embodiment of the present invention as described herein has many advantages over the prior art, including the conservation of space because a mouse and keypad are effectively combined to operate in the space of a separate mouse or keypad. Furthermore, the combination of a keypad and a mouse is not only economical with space, but is also more economical financially than a separate mouse and keypad. A still further advantage is that only one I/O port is required for the combination of the mouse and keypad, which, if separate, would require an additional port which is not available on many portable computers.

Figure 3:
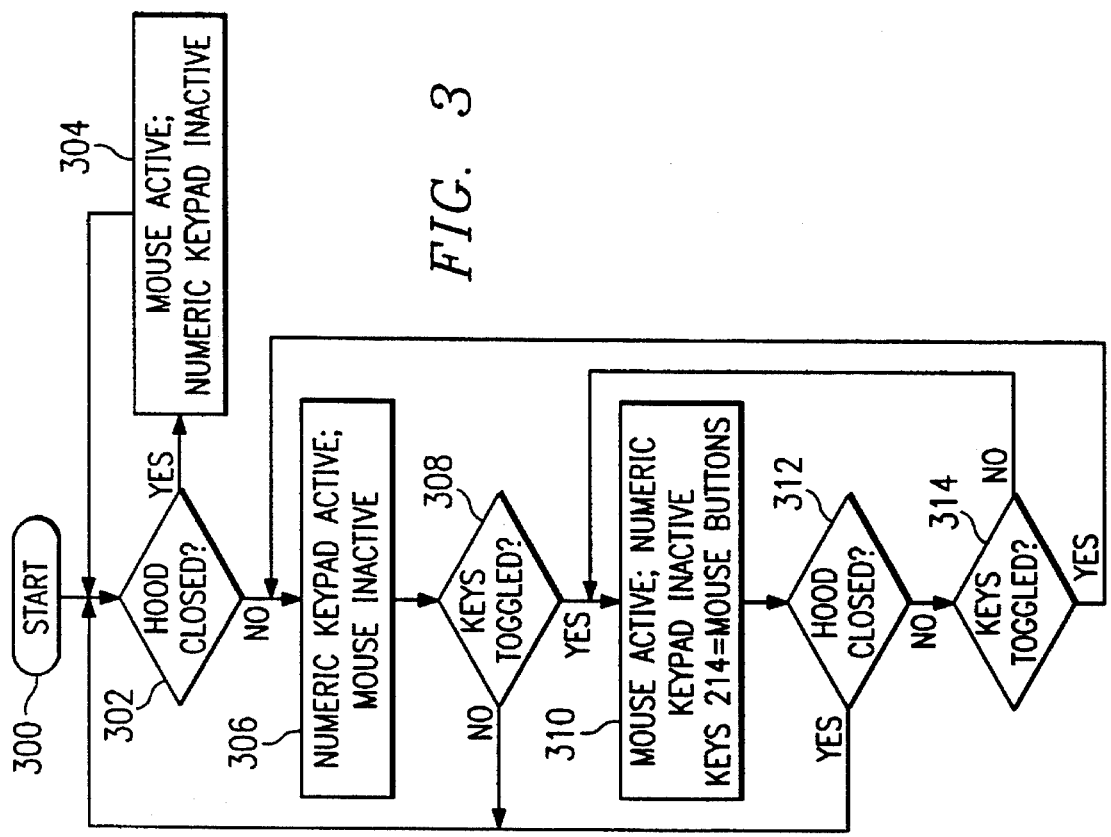
FIG. 3 is a flowchart illustrating control logic utilized in one embodiment of the present invention.

In an alternate embodiment of the present invention, the mouse ball 202 and buttons 204 are activated for entering graphical location data only when the hood 210 is closed or when the keys 214 are toggled for operation as mouse pointer select buttons, and the keys 208 are activated for numerical entry only when the hood 210 is open and the keys 214 are toggled for operation as numerical data entry keys. FIG. 3 is a flow chart illustrating control logic for operating the device 14 in accordance with the alternative embodiment of the invention, it being understood that microcode instructions for implementing the control logic may be stored in the memory 20 of the computer 12. Referring again to FIG. 1, the switch 30 is operatively disposed between the hood 210 and the microprocessor 28 such that the position of the switch is indicative of whether the hood 210 is open or closed.

Referring to FIG. 3, power is applied in step 300, at which point execution begins and proceeds to step 302. In step 302, a determination is made whether the hood 210 is closed, as indicated by the switch 30. If in step 302 it is determined that the hood 210 is closed, execution proceeds to step 304, in which the mouse ball 202 and buttons 204 are activated and the numerical keys 208 are deactivated, and then returns to step 302.

If in step 302 it is determined that the hood 210 is open, execution proceeds to step 306, in which the numerical keys 208 are activated and the mouse ball 202 and buttons 208 are deactivated. Execution then proceeds to step 308, in which a determination is made whether the keys 214 have been toggled, such as by a user's pressing the predetermined combination of keys on the keyboard 22. If in step 308 it is determined that the keys 214 have not been toggled, execution returns to step 302. If in step 308 it is determined that the keys 214 have been toggled, execution proceeds to step 310, in which the mouse ball 202 and the keys 214 are activated and the mouse buttons 204 and the numerical keys 208, other than the keys 214, are deactivated. Execution then proceeds to step 312, in which a determination is made whether the hood 210 is closed. If in step 312 it is determined that the hood 210 is closed, execution returns to step 302. Otherwise, execution proceeds to step 314, in which a determination is made whether the keys 214 have been toggled. If in step 314 it is determined that the keys 214 have been toggled, execution returns to step 306. Otherwise, execution returns to step 310.

In addition to the advantages of the previous embodiment, using the alternate embodiment of the device 14, graphical location data and numerical data may not be inadvertently entered at the same time. Therefore, if the device 14 is inadvertently moved, and thus the mouse ball 202 rolled, while entering numerical data, the movement will have no effect on the graphical display 24. Similarly, if the device 14 is in some manner jolted, or any key 208 is inadvertently depressed, while the ball 202 is being rolled to enter graphical location data, then there will be no numerical data entry.

In yet another alternate embodiment, the mouse ball 202 and buttons 204 are activated for entering graphical location data only when the hood 210 is closed or when the keys 214 are toggled for operation as mouse pointer select buttons, and the keys 208 are activated for numerical entry only when the hood 210 is open, but regardless of whether the keys 214 are toggled for operation as mouse pointer select buttons or numerical data entry keys. In this embodiment, when the hood 210 is open and the keys 214 are toggled for operation as mouse pointer select buttons, the keys 208, other than the keys 214, are operable for inputting numerical data to the computer 12, while the mouse ball 202 may be used in combination with the keys 214 to enter graphical location data to the computer 12. In this manner, the device 14 may function simultaneously as a mouse and as a numerical keypad.

In addition to the advantages of the previous embodiment, using the alternate embodiment of the device 14, graphical location data and numerical data may not be inadvertently entered at the same time. Therefore, if the device 14 is inadvertently moved, and thus the mouse ball 202 rolled, while entering numerical data, the movement will have no effect on the graphical display 24. Similarly, if the device 14 is in some manner jolted, or any key 208 is inadvertently depressed, while the ball 202 is being rolled to enter graphical location data, then there will be no numerical data entry.

It is understood that the present invention can take many other forms and embodiments. The embodiments shown herein are intended to illustrate rather than to limit the invention, it being appreciated that variations may be made without departing from the spirit or the scope of the invention. For example, rather than pressing a key combination on the keyboard 22 to toggle the four keys 214 to operate as either mouse pointer select buttons or numerical data entry keys, a combination of keys on the keypad 206 or a toggle button disposed on the keypad may be depressed.

In still further embodiments, the device 14 may be communicative with the computer 12 by plugging the device into the keyboard 22 attached to the computer or by using infrared light instead of the cable 16 to transmit signals to the computer.

In still further embodiments, mechanisms, such as a friction pad connected to the hood 210, may be used to restrain the mouse ball 202 from rolling when the hood is open so that the device 14 won't move when numerical data is entered.

In still further embodiments, the hood 210 may be detachable. For example, the hood 210 may be connected to the device 14 by the hinge 212 so that it may rotate approximately 180°, but so that it may also be removed when rotated approximately 90°. Removal of the hood would facilitate using both the buttons 204 and the keys 208 without toggling the keys 214. The hood hinge 212 could also be located at the forward or rearward end of the device 14 so that both the mouse buttons 204 and the numerical data entry keys 208 would be accessible without removal of the hood 210.

Although illustrative embodiments of the invention have been shown and described, a wide range of modification, change, and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A device for inputting graphical location data and numerical data to a computer having a graphical display, the device comprising:

a housing;

a mouse portion disposed within said housing and including a ball rollingly disposed on a bottom side of said housing, said mouse portion being operative for inputting to said computer said graphical location data for said graphical display and further including at least one pointer select button disposed on a first portion of a top side of said housing and operative for selecting graphical objects on said graphical display;

a numerical data entry portion including a plurality of keys disposed on a second portion of said top side of said housing and operative for inputting said numerical data to said computer; and a hood rotatably connected to said housing between said first and second portions of said top side of said housing for rendering said plurality of keys inaccessible and for rendering an ergonomic shape to said device when said hood is rotated to a first position.

2. The device of claim 1 wherein said first portion is positionally fixed relative to said second portion, and said hood is rotatable to a second position, in which said plurality of keys is rendered accessible to said user, said at least one pointer select button being accessible in either of said first or second hood positions.

3. The device of claim 1 further comprising means for toggling operation of at least first and second ones of said plurality of keys between a first mode, in which said first and second ones of said plurality of keys are operative as numerical data entry keys, and a second mode, in which said first and second ones of said plurality of keys are operative as mouse pointer select buttons.

4. The device of claim 3 further comprising means disposed on said housing for indicating whether said first and second ones of said plurality of keys are operating in said first mode or said second mode.

5. The device of claim 4 wherein said indicating means comprises a light emitting diode (LED).

6. The device of claim 1 further comprising:
   means for detecting whether said hood is in a first or second position; and
   means for preventing input of said numerical data to said computer when said hood is in said first position and for preventing input of said graphical location data to said computer when said hood is in said second position.

7. The device of claim 6 wherein said detecting means is a switch.

8. The device of claim 1 wherein said means for preventing comprises:
   a microprocessor;
   a memory device electrically connected to said microprocessor; and
   logic instructions stored in said memory device and executable by said microprocessor.

9. A device for inputting data to a computer having a display, the device being communicative with the computer through a single input/output (I/O) port, the device comprising:
   housing means;
   means for inputting graphical location data for controlling a location of an image on said display;
   means, disposed on a forward portion of a top side of said housing means, for inputting selection data for selecting objects on said display;
   means, disposed on a rearward portion of said top side of said housing means, for inputting numerical data, said rearward portion being positionally fixed relative to said forward portion;
   means for processing said input graphical location data, selection data and numerical data and generating output signals to said computer responsive to said processing; and
   a hood hingedly attached to said top side of said housing means, said hood being rotatable between a first position, in which said means for inputting numerical data is rendered inaccessible, and a second position, in which said means for inputting numerical data is rendered accessible, said means for inputting selection data being accessible in either of said first or second hood positions, said hood further being shaped for rendering an ergonomic shape to said device.

10. The device of claim 9 wherein said output signals are useable by said computer for controlling a location of an image presented on said display.

11. The device of claim 9 wherein said hood is hingedly attached between said forward and said rearward portions.

12. The device of claim 9 wherein said means for processing and generating comprises a microprocessor.

13. The device of claim 9 wherein said means for inputting graphical location data comprises a mouse ball rollingly disposed on a bottom side of said housing.

14. The device of claim 9 wherein said means for inputting selection data comprises at least one mouse pointer select button.

15. The device of claim 9 wherein said means for inputting numerical data comprises a keypad including a plurality of keys.

16. The device of claim 15 wherein said keypad includes at least twelve keys, and wherein each of said keys represents a selected one of ten digits, a decimal point, or an enter function.

17. The device of claim 15 wherein said keypad includes at least four keys, and wherein each of said four keys represents one of an addition, subtraction, multiplication, or division function.

18. The device of claim 15 wherein at least a first and a second key of said keypad are selectively operable in a first mode, in which said first and second keys function as numerical data entry keys, and a second mode, in which said first and second keys function as mouse pointer select buttons, the device further comprising means for selectively actuating said first and second keys between operation in said first mode and said second mode.

19. The device of claim 16 wherein said actuation means comprises two of said plurality of keys.

20. The device of claim 18 further comprising means for visually indicating the mode of operation of said first and second keys.

21. The device of claim 20 wherein said indicating means is a light emitting diode (LED).

22. A method of inputting graphical location data and numerical data to a computer having a display, the method comprising: integrating a mouse and a numerical keypad into a device;
   electrically connecting said device to said computer;
   providing at least one pointer select button and said numerical keypad on a top side of said device;
   determining a position of a hood rotatably attached to said device, said hood covering only said numerical keypad and further rendering an ergonomic shape to said device when said hood is in a first position;
   responsive to a determination that said hood is in said first position, causing said device to operate in a mouse mode in which said device may be used to input said graphical location data to said computer;
   responsive to a determination that said hood is in a second position, causing said device to operate in a numerical keypad mode in which said device may be used to input said numerical data to said computer.

\* \* \* \* \*